United States Patent [19]

Standley

[11] 4,075,820
[45] Feb. 28, 1978

[54] SPIN WELDING APPARATUS
[75] Inventor: Wendell Evert Standley, Lake Forest, Ill.
[73] Assignee: Abbott Laboratories, North Chicago, Ill.
[21] Appl. No.: 709,362
[22] Filed: Jul. 28, 1976
[51] Int. Cl.² .......................... B65B 7/28; B67B 3/08; B29C 27/08; B23K 28/00
[52] U.S. Cl. ........................................ 53/329; 53/331; 156/73.5; 156/69; 156/580.1; 228/2
[58] Field of Search .................. 53/300, 329, 373, 367, 53/306, 308, 310, 317; 156/73.5, 580, 580.1, 69; 228/2

[56] References Cited

U.S. PATENT DOCUMENTS

| | | | |
|---|---|---|---|
| 1,912,677 | 6/1933 | Williams | 53/300 |
| 2,987,313 | 6/1961 | Bjering et al. | 53/300 X |
| 3,245,858 | 4/1966 | Negoro | 156/73.5 X |
| 3,297,504 | 1/1967 | Brown et al. | 156/580 X |
| 3,309,836 | 3/1967 | Hallowell, Jr. | 53/373 X |
| 3,316,135 | 4/1967 | Brown et al. | 156/580 X |
| 3,537,231 | 11/1970 | Dimond | 53/317 X |
| 3,690,088 | 9/1972 | Anderson et al. | 53/329 X |
| 3,759,770 | 9/1973 | Brown et al. | 156/580 X |

Primary Examiner—Othell M. Simpson
Assistant Examiner—Horace M. Culver
Attorney, Agent, or Firm—Robert L. Niblack; Neil E. Hamilton

[57] ABSTRACT

A spin or friction welding apparatus which can accurately locate a container such as a semirigid plastic bottle with respect to an overcap which is to be frictionally welded to the bottle by means of a rotatable spindle member. In order to assure that the overcap is secured to the bottle neck when employing high production machinery utilizing a rotating spindle mechanism for frictionally engaging the cap on a stationary bottle, many tolerances must be compensated for in the dimensions of the cap, the size of the neck on the container, as well as the positioning of the cap in relation to the container. To compensate for these variables, a biasing means is provided in conjunction with the rotatable spindle member so as to effect a predetermined tension on the cap member when it engages the stationary container neck and is spun into frictional engagement with it. Further, means are provided in the form of oppositely disposed jaw members with surfaces to surround the neck of the container and position it precisely in axial alignment with the rotatable member. To further assure proper alignment during frictional engagement of the cap and the container neck, the support means for the container is moved out of position so that the only vertical support of the bottle is by means of these jaw members which contact the lower surface of the rib on the container neck. This support contact prevents vertical deformation and horizontal deflection of the bottle and rotation of the bottle is prevented by means of lateral wall members.

34 Claims, 14 Drawing Figures

FIG. 1.
FIG. 2.
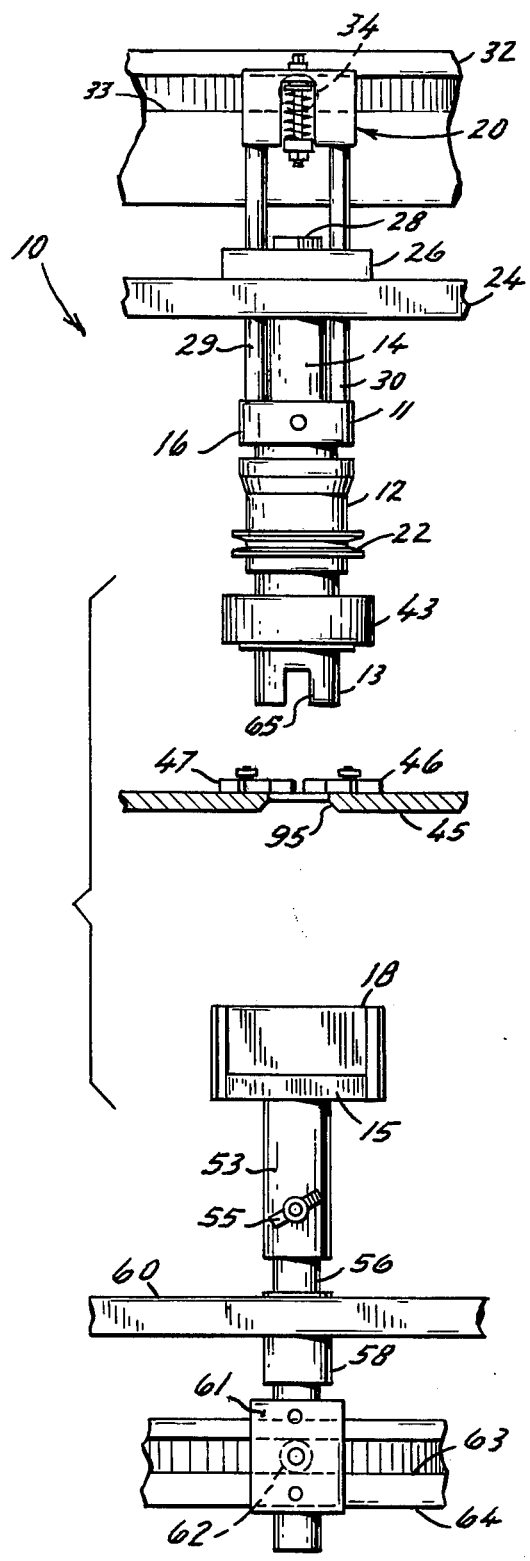
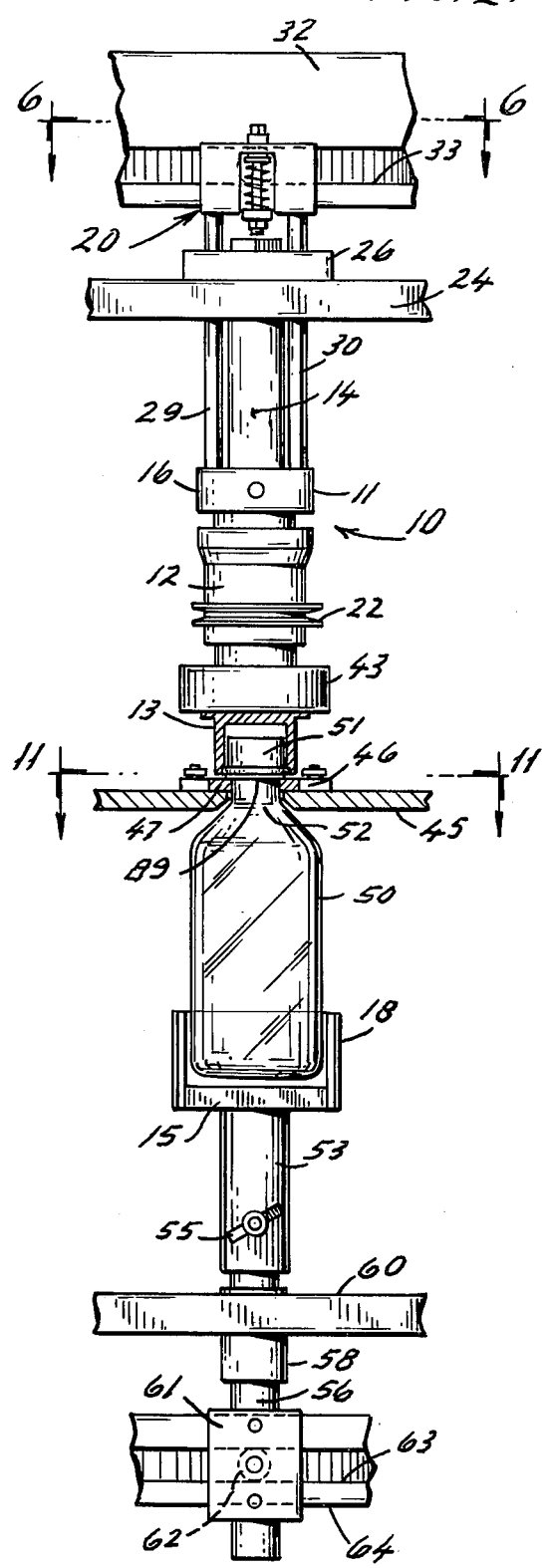

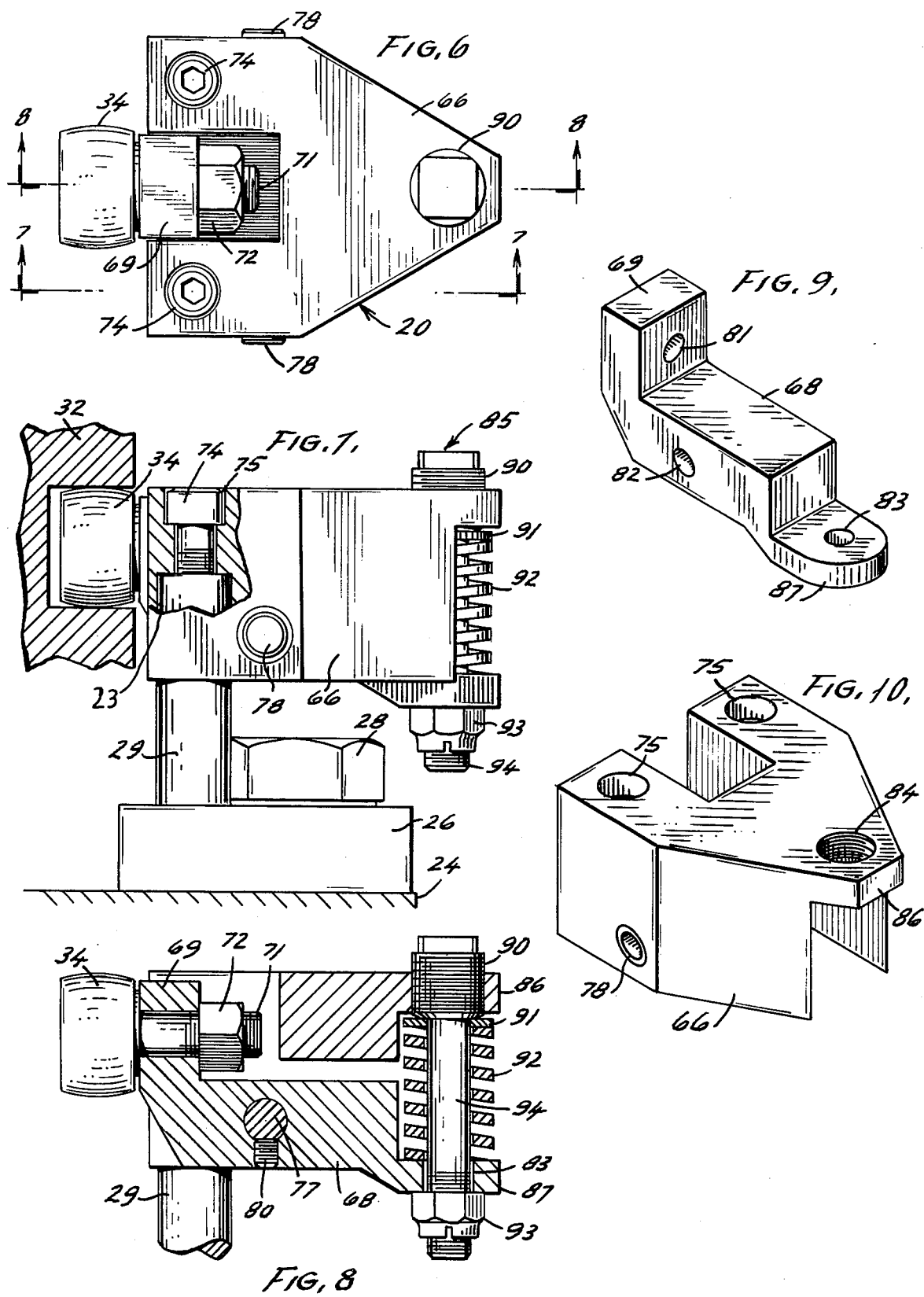

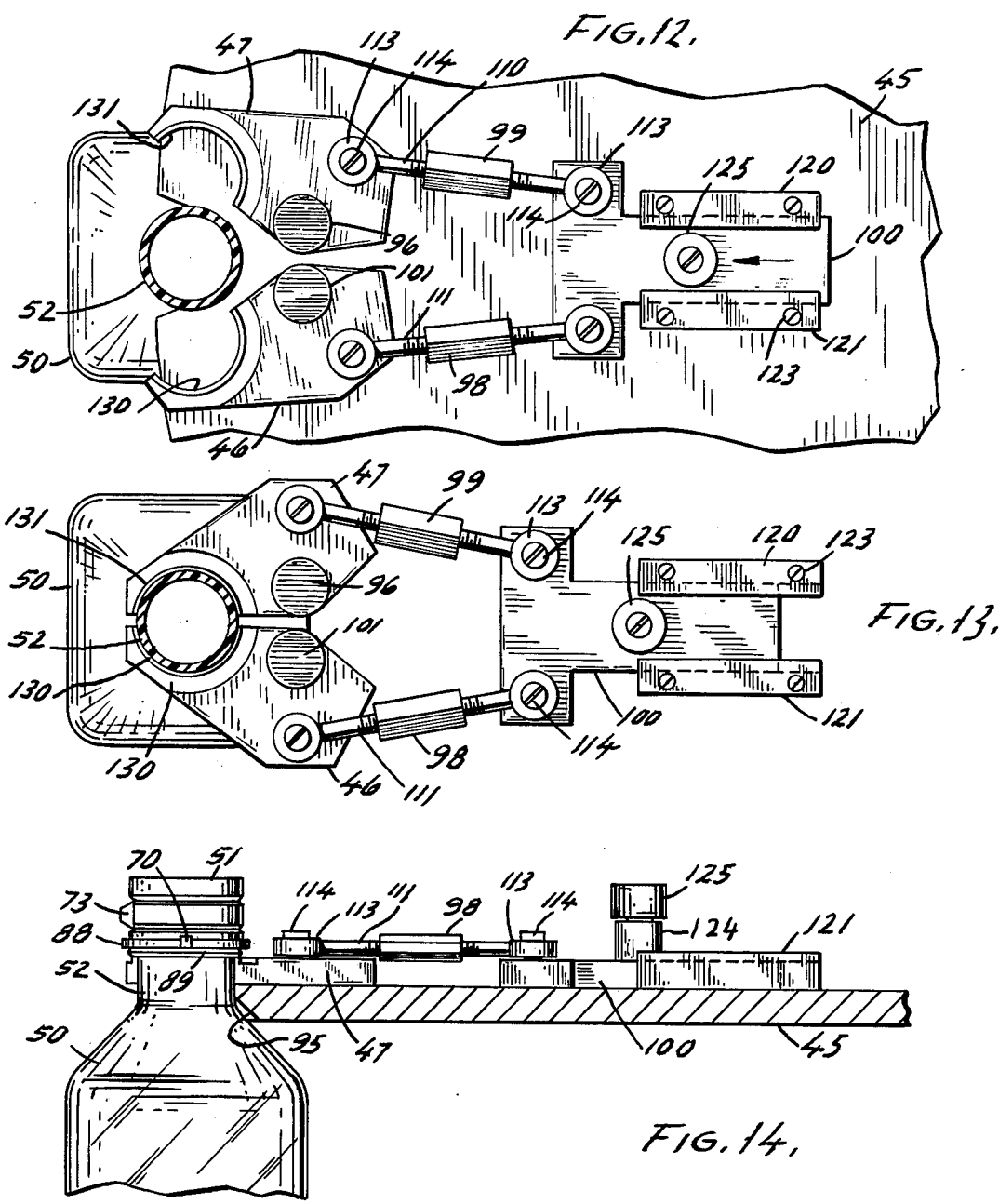

SPIN WELDING APPARATUS

BACKGROUND OF THE INVENTION

This invention relates to an apparatus for spin welding one member to another. More particularly, it relates to a spin welding device which can accurately and consistently effect frictional engagement between a cap and a container at high production rates while compensating for numerous variables in the cap, container and machine design.

The friction-type welding apparatus of the type generally concerned with in this invention is described in U.S. Pat. Nos. 3,216,874; 3,220,908; 3,297,504; 3,316,135; 3,499,068 and 3,607,581. All of these patents describe the general mechanisms and procedures for friction welding two thermoplastic components together. However, these patents teach the formation of a container from two different flexible components and is unlike the present apparatus which is directed to the sealing of a rigid thermoplastic cap to a rigid thermoplastic container neck. Problems arise in spin welding equipment in that variables will exist in the container neck rib as well as the cap when frictional engagement is to be effected for purposes of sealing the cap to the rib. Further, tolerances in machine design do occur which when added to the previously referred to variables result in caps which do not adequately seal to the container. The prior art nowhere offers a solution to this problem and nowhere is there available a machine which can accomplish the foregoing mentioned sealing of an overcap on a semirigid container at a high capacity rate.

It is an advantage of the present invention to provide an apparatus for frictionally joining a cap to a container. Other advantages are an apparatus which can secure plastic cap members to plastic containers which will allow for tolerances in the cap and the container and effect a secure bonding; an apparatus which will perform the foregoing advantages at a high rate of speed; an apparatus which can orientate a cap member with the neck of a container in a secure manner so that the cap can be frictionally engaged on the container by rotating the cap member at a high rate of speed; and an apparatus which can spin weld a substantially thick thermoplastic cap member to a semirigid thermoplastic bottle which has a rather thin wall construction, is elongated in configuration, and filled with an irrigation solution.

SUMMARY OF THE INVENTION

The foregoing advantages are accomplished and the shortcomings of the prior art are overcome by the present apparatus for frictionally joining a plastic cap member to the neck of a container wherein a rotatable spindle member having a head portion adapted to releasably engage the cap is moved in a direction toward the container and includes biasing means to effect a predetermined tension on the spindle and the cap member as it engages the neck of the container. Means are provided to support the container and prevent rotation when the cap engages the container. To assure alignment of the bottle with the cap, means in the form of jaw members are provided to surround the neck of the container to position it in axial alignment with the rotating spindle member and support the neck to prevent vertical deformation and horizontal deflection. The spindle contains a pulley for engagement with the usual belt for rotation of the spindle. In a preferred embodiment, the rotatable spindle member is moved toward and away from the container by means of a cam follower positioned in conjunction with the usual cam track. The biasing means is connected to the cam follower and includes a spring member positioned between a rocker arm attached to the cam follower and a mounting block which receives mounting rods for the mandrel assembly. Further, pivoting means are provided between the rocker arm and the mounting block to afford partial rotation of the rocker arm in the mounting block.

BRIEF DESCRIPTION OF THE DRAWINGS

A better understanding of the present spin welding apparatus for securing a plastic cap member to a container will be afforded by reference to the drawings wherein:

FIG. 1 is a view in side elevation showing the mandrel and rotatable spindle member supported from a cam track with the biasing means positioned between the cam follower and the mounting rods for the mandrel assembly and the mandrel assembly axially aligned with the lower support means for the container.

FIG. 2 is a view similar to FIG. 1 expect showing the container in position for engagement with the rotatable spindle member and with portions broken away to show the alignment means for the container neck.

FIG. 6 is a partial top view taken horizontally along line 6—6 of FIG. 2.

FIG. 7 is a view in partial vertical section taken along line 7—7 of FIG. 6.

FIG. 8 is a view in vertical section taken along line 8—8 of FIG. 6 without showing the barrel cam member.

FIG. 9 is a perspective view of the rocker arm shown in FIGS. 6 and 8 but unattached to the cam follower and the spring member.

FIG. 10 is a perspective view of the mounting block shown in FIGS. 6 and 7.

FIG. 12 is a partial top plan view of the positioning jaws shown in FIG. 11 with the jaws opened to receive or permit removal of the bottle.

FIG. 13 is a view similar to FIG. 12 except showing the jaws in a closed position around the container neck which is their configuration during the spin welding cycle.

FIG. 14 is a view in side elevation of one of the jaw members in FIGS. 12 and 13 and showing the supporting star wheel in vertical section.

DESCRIPTION OF THE PREFERRED EMBODIMENT

Figure 3:
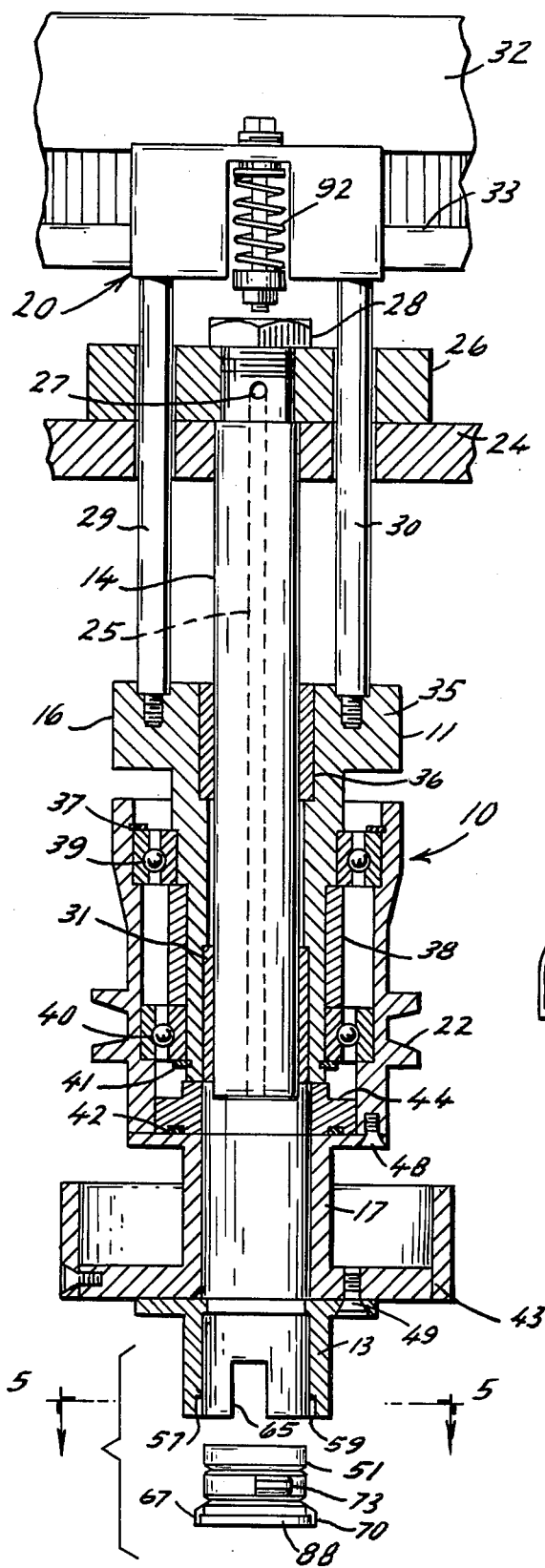
FIG. 3 is a vertical in verticl section of the mandrel assembly shown in FIGS. 1 and 2.
Figure 4:
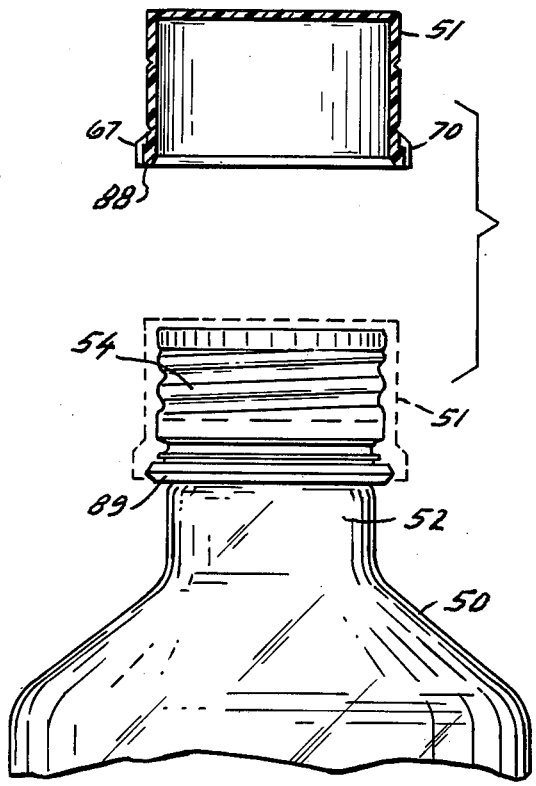
FIG. 4 is a partial view of a container having an inner cap secured thereto and an overcap spaced therefrom and shown in vertical section.

The apparatus of this invention is based on many of the concepts described in U.S. Pat. Nos. 3,220,908 and 3,297,504. Basically the apparatus 10 is a modification of the apparatus disclosed in these two patents and is adapted to frictionally spin weld a thermoplastic cap member onto a bottle having rather thin walls and with the cap having a rather heavy construction. For reference purposes the cap and bottle are described in U.S. Design Pat. No. 235,310. The apparatus of this invention will have upper and lower plate members 24 and 60, respectively, as well as a star wheel 45 secured to a drive shaft 105, all for movement in a rotary manner in a well-known turret assembly. Secured to the usual frame (not shown) of the apparatus 10 will be annular or barrel-type upper and lower cam members 32 and 64, respectively, having cam tracks 33 and 63 for accommodating cam followers 34 and 62, respectively. As the base plates 24, 60 and star wheel 45 are rotated, the spin welder unit indicated as a whole as 16 which includes mandrel 11 and rotatable head 13 will move toward and away from a container 50 positioned in star wheel 45 and container 50 will move toward and away from the spindle head by means of the respective cam tracks. The rotatable spindle 12 will be rotated by means of pulley 22 serving as the rotation means which will engage the usual moving V-belt (not shown) as the base plates 24 and 60 and star wheel 45 are rotated along a path of 360°. The containers 50 will be fed onto bottle support platform 15 in a continuous manner such as by the usual conveyor and star wheels as described in U.S. Pat. Nos. 3,220,908 and 3,297,504.

Figure 5:
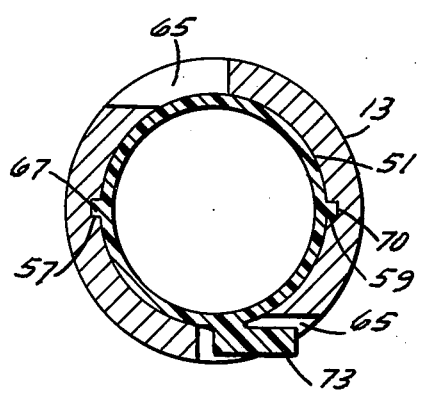
FIG. 5 is a view in horizontal section taken along line 5—5 of FIG. 3 with the cap engaged by the spindle head.

As best seen in FIGS. 1 - 3, the spin welder unit 16 includes mandrel 11 slidably secured to upper main plate 24 by means of threaded mandrel shaft 14 secured in mandrel mounting block 26 by means of securing nut 28. Mandrel mounting block 26 is secured to the upper main plate 24 by screws which are not shown. Slidably secured on shaft 14 is annular arbor 35 which contacts shaft 14 by means of bushing 31 and 36. Arbor 35 has a suitable annular compartment for supporting bearing 39 as well as 40 which are spaced by annular member 38 and are retained on the arbor by snap rings 37 and 41. A pulley member 22 is formed on the exterior and is a part of the rotatable spindle 12. A spacer 44 is secured at the end of the rotatable spindle 12 by means of screw 48 secured in a flange of annular member 43 with an O-ring 42 providing an appropriate seal. Head member 13 is in turn secured to member 43 by means of screw 49. Head 13 has an opening 65 disposed completely through the head member as well as shoulder portions 57 and 59. As is specifically seen in FIGS. 3 and 5, the slot 65 will accommodate an extending pull tab member 73 on cap 51 and U-shaped notches or shoulder portions 57 and 59 will serve as contact surfaces for abutments or lugs 67 and 70 on cap 51. The cap is aided in its retention in head 13 by means of a vacuum supplied by tube 25 in mandrel shaft 14. The vacuum tube is in communication with a vacuum source (not shown) in mounting block 26 such as at 27 and with the central hollow shaft 17 of annular member 43 supplying a vacuum to head 13. Annular member 43 will have camming means (not shown) mounted on its exterior surface so as to orientate opening 65 with pull tab 73 and lugs 67 and 70 with shoulders 57 and 59. Rotatable spindle 12 is interconnected to a biasing means 20 through mounting rods 29 and 30 which are accommodated through openings in upper main plate 24 and mandrel mounting block 26. Mounting rods 29 and 30 are secured in bores 23 of mounting block 66 with screws 74 in shouldered screw openings 75 thus forming a part of biasing means 20 (see FIG. 6).

Oppositely positioned from rotatable spindle 12 is a bottle support platform 15 which has an antirotation device 18 integrally connected to it. The antirotation device 18 is a U-shaped member which will accommodate the rectangular bottle 50 and prevent rotation thereof. Bottle support 15 is secured to rod 56 by a pin 55 passing through sleeve 53 and rod 56. Pin 55 is shown as a commercially available, easily removable push-button type pin commonly known as a Pip-Pin so support platform 15 and antirotation device 18 can be readily removed and replaced with a different assembly of support platform 15 and antirotation device 18 for running different size bottles. Support rod 56 is channeled through lower main plate 60 by sleeve 58 and is ultimately connected to lower cam follower mount 61 having a cam follower 62 designed to ride in cam track 63 of lower barrel cam member 64.

An important aspect of this invention is the biasing means 20 which provides a tensioning effect on rotatable spindle 12 when head 13 is moved into contact with cap 51 to friction weld it onto the annular ridge 89 of bottle 50. This tensioning is afforded through a rocker arm 68 which has secured at one end cam follower 34 which is held in place by nut 72 on the cam follower shaft 71. Rocker arm 68 is pivotally mounted in the center of a generally U-shaped mounting block 66 to which is secured the mounting rods 29 and 30, the lower ends of which are secured to mandrel 11. This pivotal mounting is afforded by axle 77 mounted in bore 82 of rocker arm 68 and rotatably secured in bearings 78 in mounting block 66. Axle 77 is nonrotatably mounted in rocker arm 68 by screw 80. Mounting block 66 and rocker arm 68 are further interconnected and spring tensioned by a spring pilot assembly 85 which is screwed into the threaded bore 84 of flange 86 in the mounting block 66 and passes through bore 83 of flange 87 of rocker arm 68 with spring 92 disposed between the flanges and in contact with washer 91 at one end and with nut 93 threaded on the shaft 94 at the opposite end.

Referring to FIGS. 11 - 14, the star wheel 45 with the associated jaw members 46 and 47 will now be explained. It will be appreciated that every notch 95 in the periphery of the star wheel represents a station into which will be accommodated in a loose-fitting manner the neck 52 of a container 50 and each station will have positioned above it a mandrel 11 and a bottle support platform 15 below the container so that a multiplicity of spindle members and oppositely disposed containers will exist. Located concentrically with each notch 95 will be a pair of jaw members 46 and 47 having semicircular portions 130 and 131, respectively, for substantially surrounding the neck 52 of the container immediately below annular rib 89. Jaw portions 130 and 131 when closed will have an inside diameter smaller than the outside diameter of container rib 89 so that the upper surfaces of jaw 130 and 131 will contact the lower surface of rig 89 and support the container as shown in FIG. 2. Jaw members 46 and 47 move from a closed position as shown in FIG. 13 to an open position as shown in FIG. 12 by means of suitable linkage mechanism composed of turnbuckles 98 and 99 pivotally attached to jaws 46 and 47 through cap screws 114 engaging rod ends 113. The same pivotal arrangement is provided at the opposing ends of turnbuckles 98 and 99 for attachment to a T-bar 100 which is slidably mounted on star wheel 45 through guides 120 and 121 anchored on star wheel 45 by screws 123. Extending upwardly from the base of T-bar 100 is cam follower 125 mounted on post 124. Jaw members 46 and 47 are pivotally secured to star wheel 45 through the utilization of shoulder screws 96 and 101.

Figure 11:
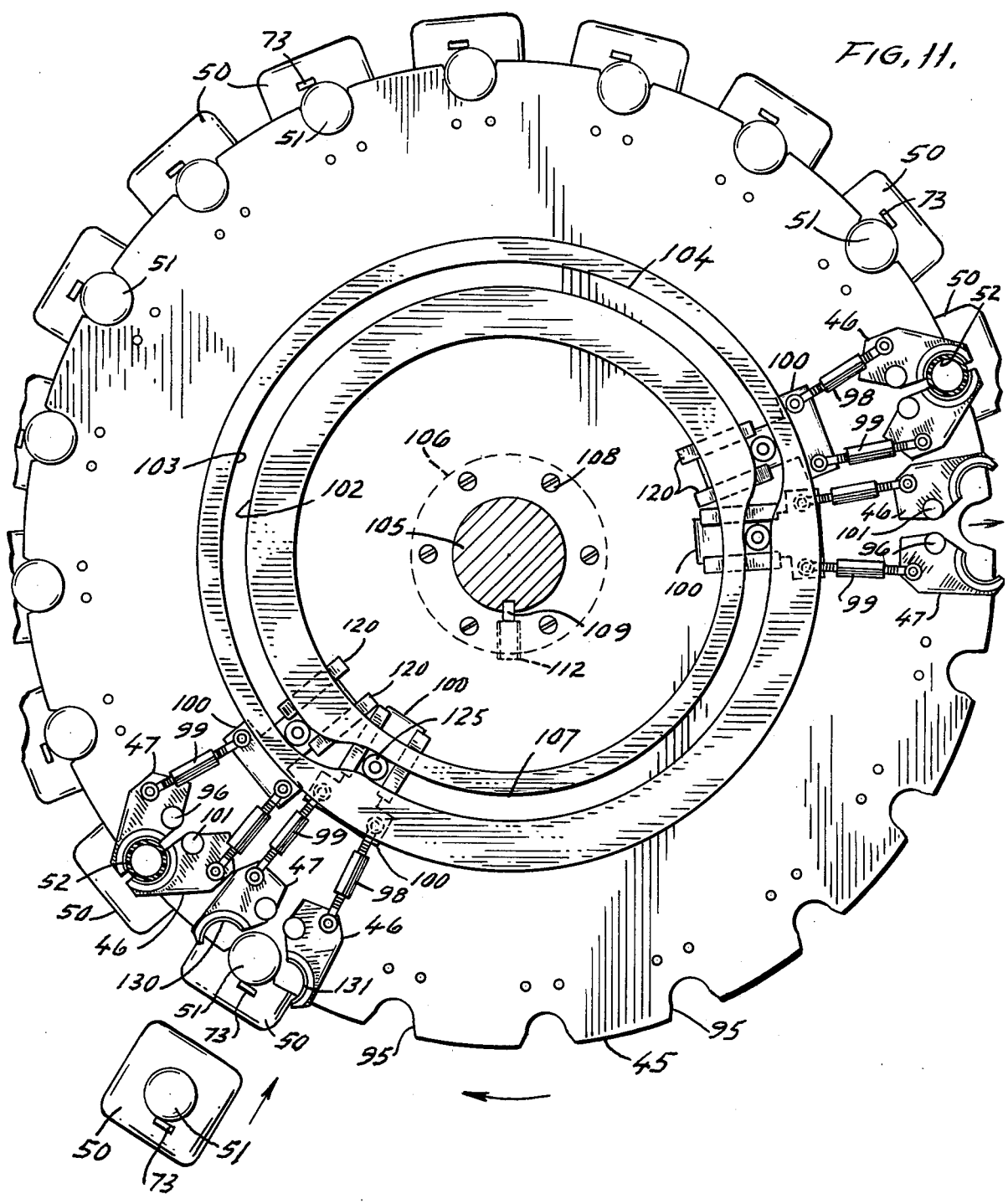
FIG. 11 is an enlarged horizontal view taken along line 11—11 of FIG. 2.

As specifically seen in FIG. 11, an annular cam member 102 has a continuous cam track 103 for engagement with the cam follower 125 for jaws 46 and 47. It will be seen that the continuous cam track has an outer larger radial portion 104 and an inner radial portion 107 to effect an opening and closing of the jaw members 46 and 47. The annular camming member 102 will be permanently fixed to the frame (not shown) of the apparatus 10 while star wheel 45 will be secured to drive shaft 105 by means of securing ring 106 keyed to the shaft by a key 109 and set screw arrangement 112 with bolts 108 providing the necessary interconnection.

OPERATION

A better understanding of the advantages of the spin welding apparatus 10 will be had by a description of its operation. Star wheel 45 will be rotated in a clockwise manner as viewed in FIG. 11. In a like manner, upper plate member 24 and lower plate member 60 will also be rotated with spin welder unit 16 and mandrel 11 orientated axially with respect to each tapered notch 95. Likewise rod member 56 for raising and lowering bottle support platform 15 will be orientated with slot 95. Bottles 50 will be fed onto platform 15 and within the confines of antirotation device 18 by the usual conveyor and star wheel mechanism. The bottles 50 will previously have been filed with an irrigation solution and have an inner cap 54 which is preferably made of light-gauge aluminum secured on the bottle. At the same time that bottles are fed onto platforms 15, caps 51 will be suitably orientated and fed into head member 13 of the rotatable spindle 12 with the tangentially extending pull tab 73 orientated in slot 65 and the abutments 67 and 70 on cap 51 engaged with shoulders 57 and 59 in head 13. The orientation of cap 51 in head 13 in the foregoing manner will be accomplished by a well-known camming mechanism (not shown) suitably operated with annular member 43 and the position of the cap. The cap 51 will be held in the previously described position by means of a vacuum supplied to the inside of the head 13 by tube 25.

The bottles will be fed into the star wheel 45 with the jaws 46 and 47 in the open position which will be that section of the cam track as indicated by the numeral 107 wherein the jaw cam follower 125 is at its inward position. As star wheel 45 is rotated in a clockwise manner as viewed in FIG. 11, jaws 46 and 47 which have portions 130 and 131 to match the outside diameter of neck 52 will close around the neck of the container and below annular rib 89 as cam follower 125 enters the outer cam track 103. With jaws 46 and 47 surrounding container neck 52 and positioned below annular rib 89, the platform 15 will be lowered away from the bottom of the container through the downward camming action of camming means 64 provided by cam follower 62 in cam track 63. The upper surfaces of jaws 46 and 47 will then contact annular rib 89 on bottle 50 and be the sole support of the bottle. This is best shown in FIG. 2. Rotatable spindle 12 will then be lowered by a similar action of camming means 32 provided by cam follower 34 in cam track 33 which is likewise best shown in FIG. 2.

However, prior to the downward camming of rotatable spindle 12, pulley 22 will be engaged by a moving V-belt to effect a rotation in the order of 4,000 revolutions per minute. After the rotating spindle 12 is spinning at the indicated rate, pulley 22 leaves engagement with the belt and the spindle is cammed downwardly. The inertia in the rotating spindle 12 causes the mating surfaces of the annular rib 88 on the cap 51 to melt and fuse with the annular rib 89 on the bottle 50. The necessary driving contact between the cap 51 and the head 13 of the rotating spindle is effected through notches 67 and 70 on the cap and abutments 57 and 59 in the head 13. After the spin welding operation is completed, further rotation of base plate 60 will effect a raising of the platform 15 to again contact bottle 50 so as to raise the freshly spun welded joint free of the jaws 46 and 47. The jaws are then cammed open by means of cam follower 125 entering the inner radial portion 107 of the continuous cam track. The completed bottle assembly with cap 51 secured over cap 54 is then plowed out through a conventional discharge star wheel assembly.

It should be pointed out that during the downward camming of the spinning rotatable spindle 12, and the contact made between the cap 51 held in head 13 as it engages annular rib 89 on the bottle, that a resilient tensioning force is effected through the mandrel 11 as the rocker arm 68 secured to the cam follower 34 is interconnected to mounting block 66, which interconnection is effected through spring 92. This interengagement by means of a fixed pressure and pivotal movement of the spin welding rocker arm compensates for many differing dimensional tolerances associated with the apparatus including the camming action of rotatable spindle 12, and the product as represented by the various dimensions including size and locations of cap annular rib 88 and the annular rib 89 on the bottle. In addition to having the tensioning member compensate for tolerances as previously described, the jaw members provide for alignment of the bottle as well as afford uniform and 360° support around the bottom of the annular rib 89 to prevent any vertical deformation or horizontal deflection. It is by means of the previously described pivotal tensioning member 20 on the spin welding head 12 in conjunction with the action of the jaw members that highly efficient weldments can be effected when the machine is operated at the rate of approximately 120 containers per minute.

It should also be pointed out that during the previously described spin welding operation of the cap 51 onto container 50 that rotation of the container 50 is prevented by means of the U-shaped antirotation member 18 when the bottle is held in a freely supported position and away from platform 15 as shown in FIG. 2.

While the utilization of the jaw members 46 and 47 in combination with the spring tensioning of the rotatable spindle member 12 is the preferred manner of securing the caps 51 onto the containers 50, they could be eliminated and the container held by means of platform 15 although this particular system is not as effective in utilizing the jaws as previously described. Further, while a spring tensioning means 20 either with or without the pivoting of the spin welding rocker arm is the preferred manner of effecting a fixed pressure or tension on the spinning head as it is moved into contact with the container neck, other means of effecting a tensioning such as a hydraulic or air cylinder head or a spring pivoted lever arm placed between the cam followers and the mounting rods 29 and 30 could be utilized. However, the spring member 92 with the pivoted rocker arm 68 as described for biasing means 20 is preferred as the tensioning force is readily adjustable by means of preloading spring 92 to any necessary level. Threaded stud 90 still provides for desired lateral deflections of the rocker arm 68 through the pivoting of axle 77 in the mounting block.

It will thus be seen that through the present invention there is now provided a biasing means for a spin welding head which will afford weldments between the cap and a container in a spin welding machine when the welding machine is operating at a high rate of speed. Weldments between a rather heavy cap member and a thin-walled bottle are provided by the combination of the pivoted, spring tensioned camming member for a spin welding head in combination with jaw members which surround the container neck and hold it in alignment as well as support it from vertical deformation and horizontal deflection. The spring tensioning means is simple in its design and construction yet readily adjustable. It can be easily mounted on existing spin welding devices without substantial capital investment.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An apparatus for frictionally joining a first member to a second member comprising:
    a rotatable spindle member having a head portion adapted to releasably engage said first member;
    means to support said second member and prevent said second member from rotating;
    means to rotatably support said spindle member;
    means to move said spindle member toward and away from said second member;
    biasing means operatively associated with said means to move said spindle member toward and away from said second member to effect a predetermined tension on said spindle member prior to and during contact of said first member on said second member and limiting the stroke of travel of said spindle member as said first member is moved toward said second member; and
    means to rotate said spindle member so as to effect frictional engagement and securing of said first member on said second member.

2. The apparatus as defined in claim 1 wherein said means to move said spindle member toward and away from said second member includes a camming surface and a cam follower operatively associated with said spindle member.

3. The apparatus as defined in claim 2 wherein said biasing means includes a spring member.

4. The apparatus as defined in claim 3 wherein said biasing means includes an adjustment means in combination with said spring member.

5. The apparatus as defined in claim 4 wherein said biasing means includes;
    a rocker arm secured to said cam follower;
    a mounting block;
    connecting means operatively associated with said spindle member, said connecting means secured in said mounting block, and said spring member operatively positioned between said rocker arm and said mounting block.

6. The apparatus as defined in claim 5 further including pivoting means interconnecting said mounting block and said rocker arm.

7. An apparatus for frictionally joining a cap member to the neck of a container comprising:
    a rotatable spindle member having a head portion adapted to releasably engage said cap member;
    means to separately support said container and prevent said container from rotating;
    means to rotatably support said spindle member;
    means to move said spindle member toward and away from said container;
    biasing means operatively associated with said means to move said spindle member toward and away from said container to effect a predetermined tension on said spindle member prior to and during contact of said cap member on said neck of said container and limiting the stroke of travel of said spindle member as said cap member is moved toward said container; and
    means to rotate said spindle member so as to effect frictional engagement and securing of said cap member on said neck.

8. The apparatus as defined in claim 7 wherein said means to move said spindle member toward and away from said container includes a camming surface and a cam follower operatively associated with said spindle member.

9. The apparatus as defined in claim 8 wherein said biasing means includes a spring member.

10. The apparatus as defined in claim 9 wherein said biasing means includes an adjustment means in combination with said spring member.

11. The apparatus as defined in claim 10 wherein said biasing means includes:
    a rocker arm secured to said cam follower;
    a mounting block;
    connecting means operatively associated with said spindle member, said connecting means secured in said mounting block, and said spring member operatively positioned between said rocker arm and said mounting block.

12. The apparatus as defined in claim 11 further including pivoting means interconnecting said mounting block and said rocker arm.

13. The apparatus as defined in claim 12 wherein said pivoting means is fixedly secured in said rocker arm and rotatably mounted in said mounting block.

14. The apparatus as defined in claim 13 wherein said mounting block is a generally U-shaped configuration with said rocker arm mounted centrally in the opening of said U-shaped opening.

15. The apparatus as defined in claim 14 wherein said mounting block and said rocker arm have extending flange portions and said adjustment means includes a threaded bolt member securing said spring member between said flange portions.

16. The apparatus as defined in claim 7 further including means to position and support the neck of said container with respect to said spindle member.

17. An apparatus for frictionally joining a cap member to the neck of a container comprising:
    a rotatable spindle member having a head portion adapted to releasably engage said cap member;
    means to support said container and prevent said container from rotating;
    means to rotatably support said spindle member;
    means to move said spindle member toward and away from said container;
    biasing means operatively associated with said means to move said spindle member toward and away from said container to effect a predetermined tension on said spindle member prior to and during contact of said cap member on said container neck and limiting the stroke of travel of said spindle member as said cap member is moved toward said container neck;

a pair of oppositely disposed jaw members each having a surface constructed and arranged to substantially surround said neck of said container and said container neck includes a rib member supported by said jaw members; and means to rotate said spindle member so as to effect frictional engagement and securing of said cap member on said neck.

18. The apparatus as defined in claim 17 wherein said jaw members are cammed in a closed position.

19. The apparatus as defined in claim 18 further including a camming means operatively associated with said jaw members to cam said jaw members to an open position.

20. The apparatus as defined in claim 19 wherein said camming means includes a continuous cam track with a camming member for said jaw members in contact with said cam track, said cam track constructed and arranged to open and close said jaw members.

21. The apparatus as defined in claim 20 further including camming means to move said means to support said container into a nonsupporting position when said spindle member is moved with said cap member to contact said rib on said container neck to be secured thereto.

22. In a spin welding apparatus for frictionally securing thermoplastic caps to thermoplastic neck surfaces of containers, said apparatus comprising:

a rotatable support means to support a multiplicity of oppositely disposed rotatable spindle members having head portions adapted to engage said caps;

means to position and support said containers and prevent said containers from rotating;

means to move said spindle members toward and away from said containers; and means to rotate said spindle members, the improvement comprising;

biasing means operatively associated with each said means to move said spindle members toward and away from said containers to effect a predetermined tension on said spindle members and said caps on said neck of said containers, said biasing means effecting a predetermined tension on said spindle members prior to and during contact of said caps on said neck surfaces and limiting the stroke of travel of said spindle member as said cap member is moved toward said container so as to effect frictional engagement and uniform securing of said cap on said neck surfaces.

23. The spin welding apparatus as defined in claim 22 wherein said container is filled with an irrigation solution.

24. The spin welding apparatus as defined in claim 23 wherein an inner cap is placed on said container and said cap is secured over said inner cap.

25. The spin welding apparatus as defined in claim 22 wherein said means to move said spindle members toward and away from said container includes a camming surface and a cam follower operatively associated with each said spindle member to move said spindle members toward and away from said container.

26. The spin welding apparatus as defined in claim 25 wherein said biasing means includes a spring member.

27. The spin welding apparatus as defined in claim 26 wherein said biasing means includes an adjustment means in combination with said spring member.

28. The apparatus as defined in claim 27 wherein said biasing means includes:

a rocker arm secured to said cam follower;
a mounting block;
connecting means operatively associated with said spindle members;
said connecting means secured in said mounting block; and
said spring member operatively positioned between said rocker arm and said mounting block.

29. The apparatus as defined in claim 28 further including pivoting means interconnecting said mounting block and said rocker arm.

30. The apparatus as defined in claim 29 wherein said pivoting means is fixedly secured in said rocker arm and rotatably mounted in said mounting block.

31. The spin welding apparatus as defined in claim 30 wherein said mounting block is of a generally U-shaped configuration with said rocker arm mounted centrally in the opening of said U-shaped opening.

32. The spin welding apparatus as defined in claim 31 wherein said mounting block and said rocker arm have extending flange portions and said adjustment means includes a threaded bolt member securing said spring member between said flange portions.

33. The spin welding apparatus as defined in claim 22 wherein said neck surface on said container includes an annular rib and said apparatus further includes means to position the neck of said container and support said container by means of said rib with respect to said spindle members.

34. The spin welding apparatus as defined in claim 22 wherein said means to position and support said container is defined by a multiplicity of pairs of oppositely disposed jaw members each having a surface constructed and arranged to substantially surround the neck of said containers and said container neck includes a rib member supported by said jaw members.

* * * * *